United States Patent Office 2,992,333
Patented July 11, 1961

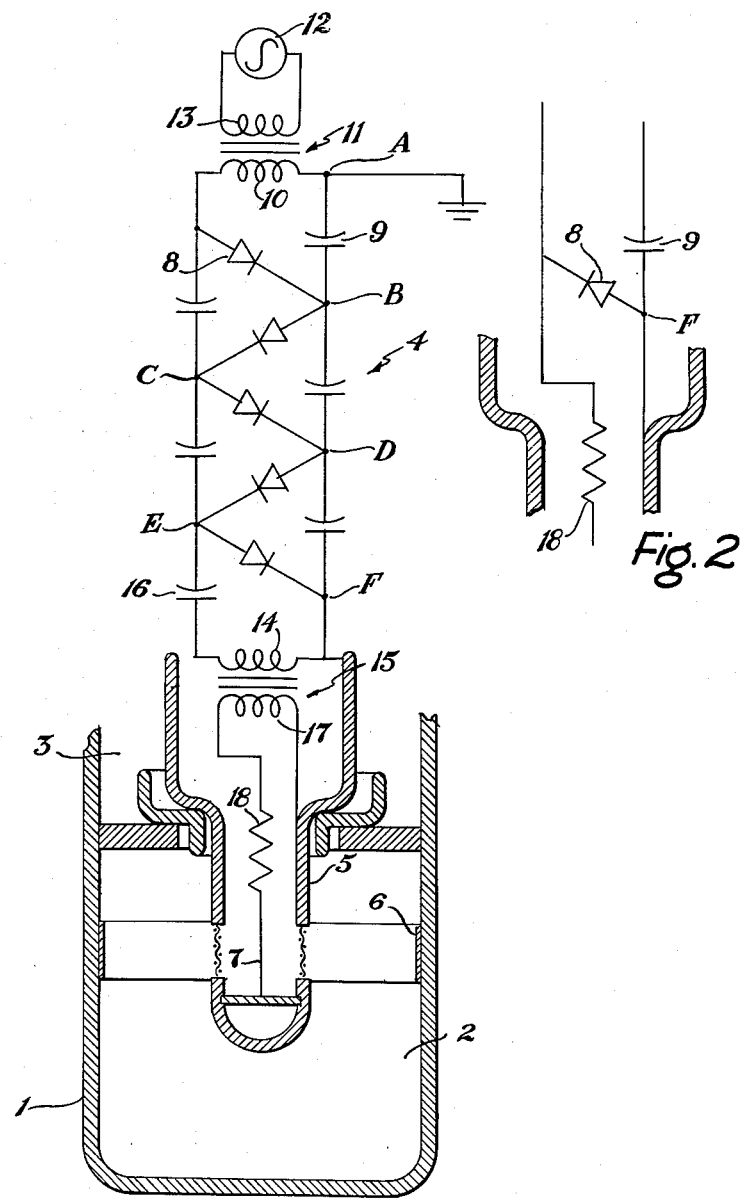

2,992,333
COMPACT NEUTRON SOURCE
Alfred J. Gale, Lexington, Mass., assignor to High Voltage Engineering Corporation, Burlington, Mass., a corporation of Massachusetts
Filed Apr. 3, 1958, Ser. No. 726,194
5 Claims. (Cl. 250—84.5)

This invention relates to neutron sources and in particular to a compact neutron source adapted for use in regions having limited volume and to which only a limited amount of power can be delivered such as boreholes. In an artificial neutron source, neutrons are produced by bombarding a suitable target with positive ions which are accelerated to high energy in an electric field between a high-voltage electrode and the target. In a neutron source of limited lateral dimensions, the voltage of the high-voltage electrode is limited by the space required for adequate insulation, and so the nuclear reaction employed must be one of those in which an adequate supply of substantially monoenergetic neutrons of relatively high energy are efficiently produced by bombarding a target with positive ions of relatively moderate energy. In radioactivity well-logging, the remoteness of the neutron source from the external power supply imposes severe limitations on the available power, and so the efficiency of the nuclear reaction employed is of prime importance.

Suitable nuclear reactions include the d, T; the t, D; the d, D; the d, Li; and the d, Be reactions. Of these reactions, the deuterium-tritium reactions are preferred, since they are the most efficient and provide neutrons having the most energy; and of the two deuterium-tritium reactions, the d, T reaction is preferred to the t, D reaction, since for a given acceleration voltage deuterons may be given a greater velocity than tritons. The kinetic energy of the bombarding deuteron together with the 17.6 mev. reaction energy is divided between the resulting neutron and alpha particle, the energy of the neutron being approximately 14 mev. The reaction cross-section depends upon the energy given the deuterons, with the most favorable energy being approximately 100 kev. for a thin target. The most favorable energy increases as the thickness of the target increases, since additional energy is required to penetrate the thicker target.

In such a neutron source the target is generally at ground potential so that the ions can be accelerated and must be produced within the high voltage parts of the apparatus. Where space is limited, the problem of providing the necessary voltage source for the production of ions becomes acute.

Broadly stated, the invention comprises a Cockcroft-Walton or Greinacher type of voltage generator which is adapted to provide not only the high voltage for accelerating the ions but also the relatively low voltage for producing the ions.

The invention may best be understood from the following detailed description thereof having reference to the accompanying drawing in which:

FIG. 1 is a somewhat diagrammatic view in longitudinal central section of a neutron source constructed in accordance with the invention and FIG. 2 is a diagram illustrating a modification of the electric circuit of the apparatus shown in FIG. 1.

Referring to the drawing and first to FIG. 1 thereof, the device therein shown may be constructed along the general lines disclosed in a co-pending application, Serial No. 515,435 filed June 14, 1955, which issued on Oct. 6, 1959, as U.S. Patent No. 2,907,884 and assigned to the assignee of the present invention. The entire neutron source constructed in accordance with the invention may be enclosed in a housing 1 of generally cylindrical configuration, and in the device shown in FIG. 1 the housing 1 is particularly adapted to be lowered down a borehole. The housing 1 is a conductive material and is at ground potential. The interior of the housing 1 is divided into two main compartments. The neutron source proper is housed at the lower compartment 2. The upper compartment 3 houses the voltage generator 4 which is necessary to operate the neutron source. In operation the upper compartment 3 is filled with a gas under pressure in order to insulate the various high voltage parts of the apparatus from the grounded housing 1. In operation the lower compartment 2 is filled with an appropriate gas at very low pressure. These two compartments are therefore hermetically closed off from the surrounding atmosphere and from each other.

The operation of the neutron source proper is fully disclosed in the aforementioned pending application. It is sufficient herein to state that the only power which is required to operate the neutron source is that required in generating a high voltage between the hollow electrode 5 and the grounded target 6 for the acceleration of ions and that required for generating the relatively low voltage between the filament 7 and the hollow electrode 5 for producing the ions.

In accordance with the invention, the voltage generator 4, which generates the high D.C. voltage for accelerating ions, is of the Cockcroft-Walton or Greinacher type. The principle of this circuit is well known in the art and is described for example in Lapp and Andrews, Nuclear Radiation Physics (second edition), section 10.03, pages 249–253. It is sufficient for the purposes of this application to state that such a voltage generator includes a series of rectifiers 8 and condensers 9 which are connected to the secondary 10 of a transformer 11 and which are so arranged that when relatively low voltage A.C. is fed from an alternator 12 into the primary 13 of the transformer 11, each of the condensers 9 becomes charged to the speak voltage of the secondary 10 of the transformer 11. As a result, the hollow electrode 5 which is connected to the high voltage end of the series of condensers 9 is raised to high voltage. Such an arrangement is well known in the art and need not be described herein in further detail.

In accordance with the invention, means are provided within the hollow electrode 5 for producing a relatively low voltage necessary to operate the ion source. In the device shown in FIG. 1 the primary 14 of a step down transformer 15 is connected in parallel with the rectifier 8 at the high voltage end of the generator 4. If desired, an additional condenser 16 may be provided for tuning purposes in series with the primary 14 of the step down transformer 15. During operation of the device all the condensers 9 are fully charged so that from the A.C. point of view, the rectifiers 8 may be ignored and the A.C. output from the secondary 10 of the transformer 11 is fed into the primary 14 of the step down transformer 15. As a result, a voltage is produced across the secondary 17 of the step down transformer 15 which is applied between the filament 7 and the hollow electrode 5. The output of the secondary 17 of the step down transformer 15 is A.C., but the ion source acts as a rectifier.

Since the secondary 17 of the step down transformer 15 acts essentially as a voltage source rather than a current source, the ion current between the filament 7 and the hollow electrode 5 will vary with varying pressure in the lower compartment 2. In order to render the ion source independent of gas pressure, an impedance 18 may be provided in series with the secondary 17 of the step down transformer 15, the magnitude of the impedance 18 being sufficiently great so that most of the voltage drop appears across the impedance 18 and not between the filament 7 and the hollow electrode 5.

Merely by way of example to show the relative magnitude of the voltages involved, suppose that the voltage output at the secondary 10 of the transformer 11 is 10 kilovolts A.C. R.M.S. 10 kilovolts A.C. will then appear across the primary 14 of the step down transformer 15. If the impedance 18 is eliminated, the step down transformer 15 may be so constructed that the output at the secondary 17 is two kilovolts A.C. As the impedance 18 is included, the output from the secondary 17 of the step down transformer must, of course, be greater than two kilovolts and might be as large as 10 kilovolts. In fact, the step down transformer 15 may be eliminated altogether as shown in the diagram of FIG. 2.

Referring again to FIG. 1, if the point A is grounded, the point B will acquire a D.C. voltage equal to the peak voltage output from the secondary 10 of the transformer 11. If the R.M.S. output is 10 kilovolts, the peak voltage will be 14 kilovolts so that the point B is at a D.C. potential of 14 kilovolts. Similarly the point C is at 25 kilovolts D.C., the point D at 42 kilovolts D.C., the point E at 56 kilovolts D.C. and the point F, which is connected to the hollow electrode 5 is at 70 kilovolts D.C.

Of course, only a limited amount of current may be drawn from the secondary 17 of the step down transformer 15 if undesirable reactions on the main voltage generator 4 are to be avoided. However, the neutron source with which the voltage generator 4 is used in accordance with the invention is such that only relatively low currents are required by the ion source so that the voltage generating apparatus hereinbefore described is particularly well suited for use in conjunction with such neutron source.

Having thus described the principles of the invention, together with an illustrative embodiment thereof, it is to be understood that although specific terms are employed, they are used in a generic sense and not for purposes of limitation, the scope of the invention being set forth in the following claims.

I claim:

1. A compact neutron source adapted for use in regions having limited dimensions and to which only a limited amount of power can be delivered, such as boreholes, comprising in combination: an ion source whose only power requirement is an ion-producing voltage source; a grounded neutron-producing target; a grounded source of A.C. power; two series of condensers connected in parallel between said source of A.C. power and said ion source; a series of rectifiers connected between said two series of condensers so as to produce a high unidirectional voltage between said ion source and said target; and means within said ion source for utilizing the A.C. power delivered thereto but not any part of said high uni-directional voltage as said ion-producing voltage source.

2. A compact neutron source in accordance with claim 1, wherein said ion source includes an anode and a cathode and wherein the connection between said series of condensers and said ion source comprises a step down transformer whose primary is connected between the ends of said series of condensers and whose secondary circuit is connected between said anode and said cathode.

3. A compact neutron source in accordance with claim 2, wherein the secondary circuit of said step-down transformer includes an impedance connected in series with the ion current between said anode and said cathode.

4. A compact neutron source in accordance with claim 1, wherein said ion source includes an anode and a cathode and wherein one end of one series of condensers is connected directly to said anode and one end of the other series of condensers is connected directly to said cathode.

5. A compact neutron source in accordance with claim 4, wherein at least one of said one ends is connected to the ion source through an impedance.

References Cited in the file of this patent
UNITED STATES PATENTS
2,712,081   Fearon et al. ———————— June 28, 1955

OTHER REFERENCES
Standard Handbook for Electrical Engineers, eighth edition, published by McGraw-Hill Book Company, 1949, pages 2256–2257.